United States Patent
Kimura

(10) Patent No.: US 10,363,848 B2
(45) Date of Patent: Jul. 30, 2019

(54) BACK FRAME FOR VEHICLE SEAT

(71) Applicant: TOYOTA BOSHOKU KABUSHIKI KAISHA, Aichi-ken (JP)

(72) Inventor: Masahide Kimura, Novi, MI (US)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 28 days.

(21) Appl. No.: 15/708,868

(22) Filed: Sep. 19, 2017

(65) Prior Publication Data
US 2018/0086241 A1   Mar. 29, 2018

(30) Foreign Application Priority Data
Sep. 23, 2016   (JP) ................. 2016-185922

(51) Int. Cl.
*B60N 2/68* (2006.01)
*B60N 2/64* (2006.01)
*B60N 2/20* (2006.01)
*B60N 2/22* (2006.01)

(52) U.S. Cl.
CPC .......... *B60N 2/68* (2013.01); *B60N 2/20* (2013.01); *B60N 2/22* (2013.01); *B60N 2/64* (2013.01); *B60N 2/682* (2013.01); *B60N 2205/50* (2013.01)

(58) Field of Classification Search
CPC ... B60N 2/68; B60N 2/20; B60N 2/22; B60N 2/64; B60N 2/682; B60N 2205/50
USPC .................................................. 297/354.12
See application file for complete search history.

(56) References Cited

U.S. PATENT DOCUMENTS

| 2004/0080194 A1* | 4/2004 | Medvecky | B60N 2/2887 297/253 |
| 2004/0080195 A1* | 4/2004 | Adams | B60N 2/2887 297/253 |
| 2010/0219674 A1* | 9/2010 | Sakkinen | B60N 2/0722 297/452.18 |
| 2015/0197174 A1* | 7/2015 | Akutsu | B60N 2/5825 297/452.18 |
| 2015/0274238 A1* | 10/2015 | Inoue | B62K 19/06 280/281.1 |
| 2015/0306986 A1* | 10/2015 | Jarry | B60N 2/68 297/362 |
| 2018/0162237 A1* | 6/2018 | Matsui | B60N 2/68 |

FOREIGN PATENT DOCUMENTS

JP   07-289388   11/1995

* cited by examiner

*Primary Examiner* — Mark R Wendell
(74) *Attorney, Agent, or Firm* — Greenblum & Bernstein, P.L.C.

(57) ABSTRACT

A back frame to be used in a seatback of a vehicle seat is provided. The back frame for a vehicle seat includes a frame main body, a beam member, a bracket, and an extending portion. The frame main body includes two side frames that extend in an approximately up-down direction and that are disposed spaced apart from each other in a seat width direction. The beam member is formed in a rod-like shape, is disposed between the two side frames, and extends in the seat width direction. The bracket couples the beam member to the frame main body. The extending portion is provided in an end of the bracket and extends in a direction away from the end of the bracket. The bracket includes, in the end thereof, a welded portion welded to an outer circumferential surface of the beam member.

9 Claims, 11 Drawing Sheets

BACK FRAME FOR VEHICLE SEAT

CROSS-REFERENCE TO RELATED APPLICATIONS

This application claims the benefit of Japanese Patent Application No. 2016-185922 filed on Sep. 23, 2016 with the Japan Patent Office, and the entire disclosure of which is incorporated herein by reference.

BACKGROUND

The present disclosure relates to a back frame to be used in an automobile seat, or a seat for a vehicle, such as railroad vehicles, ships, and airplanes.

For example, in a back frame disclosed in Japanese Unexamined Patent Application Publication No. H7-289388, a cylindrical bar extending in a seat width direction is welded and secured to a lower end of a frame main body formed by being pressed into a gate shape.

SUMMARY

The cylindrical bar disclosed in the aforementioned publication is welded to the frame main body in a state where a first end surface and a second end surface of the cylindrical bar in a longitudinal direction of the cylindrical bar abut respective inner sides of the frame main body. For this reason, it is difficult to improve productivity in welding work, etc.

That is, welding workablity and welding accuracy in the back frame disclosed in the aforementioned publication are greatly affected by, for example, the following (a) to (d):

(a) differences in longitudinal size of the cylindrical bar;

(b) degree of parallelism between the first and second end surfaces of the cylindrical bar;

(c) differences in size in the seat width direction of the frame main body at the lower ends of the frame main body; and (d) degree of parallelism between abutment surfaces where the first and second end surfaces of the cylindrical bar abut the frame main body.

It is preferable in one aspect of the present disclosure to provide a back frame for a vehicle seat that can improve manufacturing productivity.

The present disclosure relates to a back frame to be used in a seatback of a vehicle seat, and the back frame for the vehicle seat comprises a frame main body, a beam member, a bracket, and an extending portion. The frame main body comprises two side frames that extend in an approximately up-down direction and that are disposed spaced apart from each other in a seat width direction. The beam member is formed in a rod-like shape, is disposed between the two side frames, and extends in the seat width direction. The bracket couples the beam member to the frame main body. The extending portion is provided in an end of the bracket and extends in a direction away from the end of the bracket. The bracket comprises a welded portion in the end of the bracket, and the welded portion is welded to an outer circumferential surface of the beam member.

With the aforementioned configuration, in the back frame for a vehicle seat in the present disclosure (hereinafter, simply mentioned as "back frame"), the beam member is coupled to the frame main body via the bracket. Thus, the back frame is almost not affected by differences in longitudinal size of the beam member, degree of parallelism between the first and second end surfaces of the beam member, and so on. Thus, the back frame that improves manufacturing productivity can be obtained.

The bracket in the present disclosure is welded to the outer circumferential surface of the beam member at the end of the bracket. For this reason, the bracket may be deformed by heat at the time of welding, and other ends excluding the aforementioned end of the bracket may be largely displaced to be away from or come close to the beam member.

If the above-described large thermal deformation occurs in the bracket, this bracket and therefore, the beam member may not be appropriately coupled and secured to the frame main body. To solve this problem, in the present disclosure, the extending portion extending in a direction away from the end of the bracket is provided in the end of the bracket.

For this reason, in a case where thermal deformation occurs in the bracket by heat at the time of welding, the extending portion comes in contact with the outer circumferential surface of the beam member, thereby inhibiting further development of the thermal deformation. Consequently, large deformation of the bracket can be inhibited.

In this regard, in either of the following cases, that is, where the extending portion is already in contact with the outer circumferential surface prior to the welding and where the extending portion is not in contact with the outer circumferential surface prior to the welding, the above-described effects of inhibiting deformation can be obtained. In other words, in the back frame of the present disclosure, it does not matter whether the extending portion is in contact with the beam member.

Moreover, the present disclosure may be configured as follows.

Specifically, the extending portion may be provided at a section of the end of the bracket; the section of the end of the bracket is located in a direction along the outer circumferential surface of the beam member. With this configuration, it can be ensured that effects of inhibiting deformation are obtained.

The extending portion may extend from the end of the bracket in a direction approximately parallel to a tangential direction of the outer circumferential surface of the beam member at the welded portion. This can further ensure that effects of inhibiting deformation are obtained.

A weld bead on the welded portion may extend in a direction approximately parallel to a longitudinal direction of the beam member. With this configuration, compared with welding along an outer circumferential direction of the beam member, it can be ensured that the bracket is welded and secured to the beam member.

When the back frame comprises a coupling rod that causes the two recliners to switch between the locked state and the unlocked state, the beam member may extend in a direction approximately parallel to the coupling rod at a position displaced from the coupling rod in a seat front-rear direction.

The frame main body may comprise a lower panel that extends in the seat width direction and that couples to respective lower ends of the two side frames. The bracket may comprise a first bracket coupled to the lower panel at a first end of the coupling rod in the seat width direction, and a second bracket coupled to the side frame at a second end of the coupling rod in the seat width direction.

With this configuration, for example, compared with a case where both the first bracket and the second bracket are secured to the lower panel, where both the first bracket and the second bracket are secured to the side frames, differences in size, etc., of the beam member, the first bracket, and the second bracket can be easily accommodated, thereby coupling and securing the beam member to the frame main body.

BRIEF DESCRIPTION OF THE DRAWINGS

An example embodiment of the present disclosure will be described hereinafter with reference to the accompanying drawings, in which.

DETAILED DESCRIPTION OF THE PREFERRED EMBODIMENTS

Figure 1:
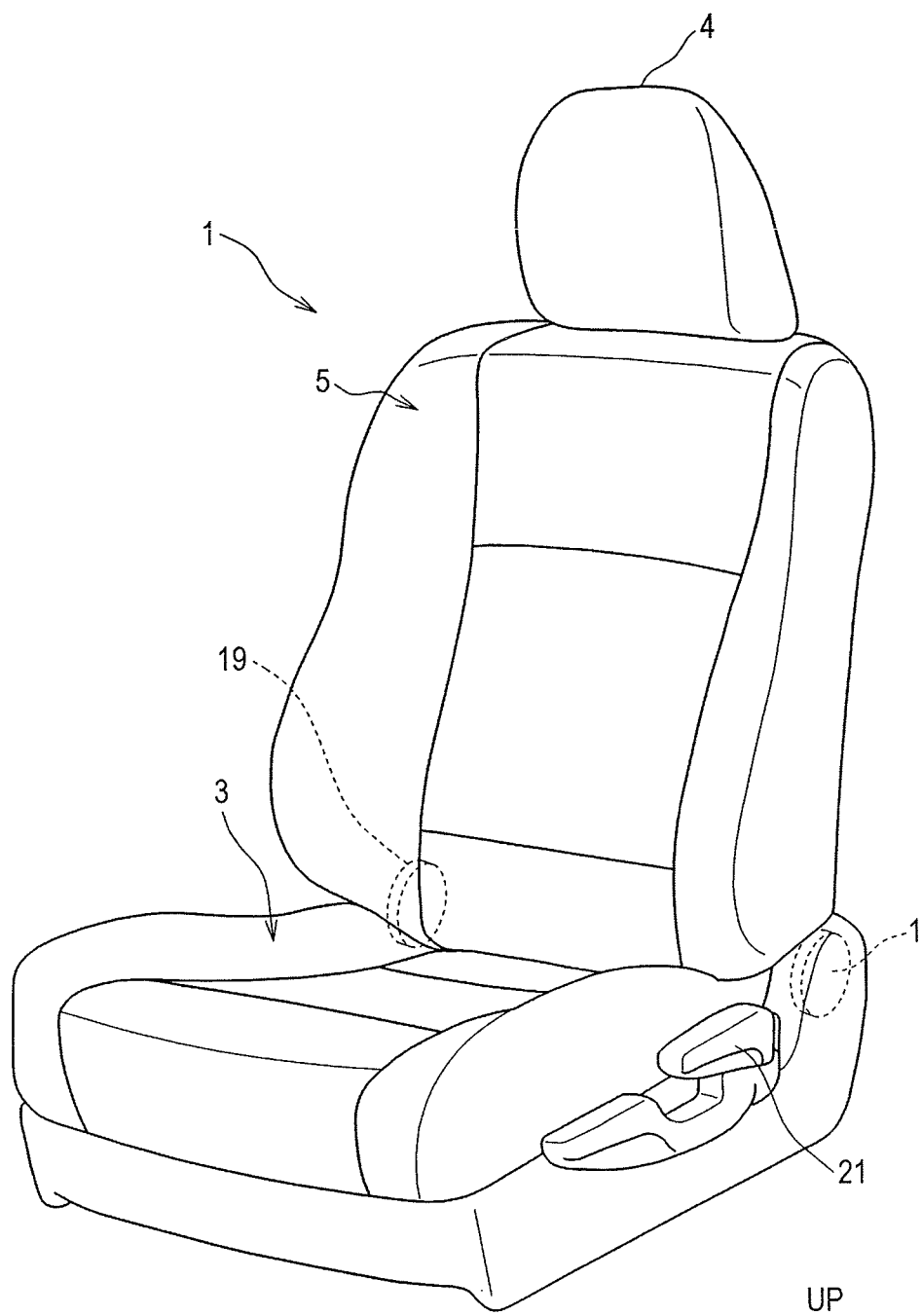
FIG. 1 is a perspective view showing an appearance of a vehicle seat according to an embodiment.
Figure 1:
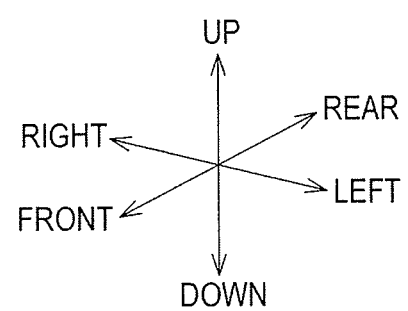

Embodiments described below illustrate one example of embodiments that fall within the technical scope of the present disclosure. Thus, subject matters specifying the invention recited in the claims are not limited to the specific configurations, structures, etc. described in the below-described embodiments.

Arrows, etc. in each figure indicating directions are used to facilitate understanding of the relationship between the figures. The arrows (or direction), etc. used in each figure do not limit the scope of the present disclosure.

As for at least members or parts described below added with reference numerals, at least one of such members or parts is provided unless otherwise specified as "one" or the like. In other words, two or more such members may be provided.

[First Embodiment]

In the present embodiment, a front seat of a passenger car will be described. Directions mentioned in the following descriptions indicate directions in a state where a vehicle seat according to the present embodiment is assembled in a vehicle.

1. Overview of Vehicle Seat

As shown in FIG. 1, a vehicle seat 1 comprises at least a seat cushion 3 and a seatback 5. The seat cushion 3 is a portion for supporting a seated person's hip, etc. The seatback 5 is a portion for supporting the seated person's back. The seatback 5 can be pivoted (reclined) with respect to the seat cushion 3 in a seat front-rear direction.

Figure 2:
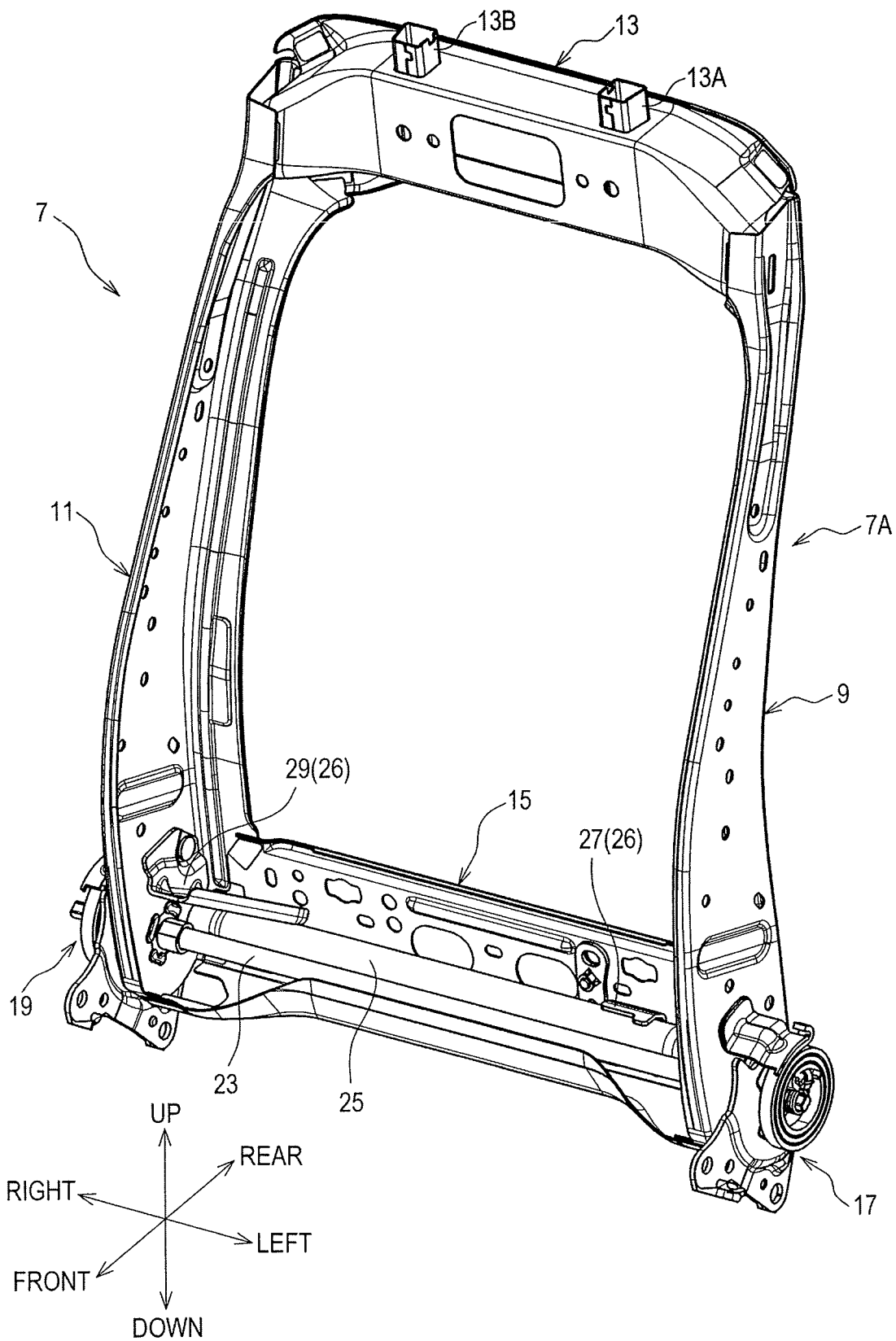
FIG. 2 is a perspective view showing an appearance of a back frame according to a first embodiment.

A back frame 7 shown in FIG. 2 is a frame forming a framework of the seatback 5 and is coupled to a cushion frame (not shown) so as to be pivotable with respect to the cushion frame. The cushion frame is a frame forming a framework of the seat cushion 3.

The back frame 7 comprises at least two side frames 9, 11, an upper panel 13, and a lower panel 15. The side frames 9, 11 are frames that extend in an approximately up-down direction and that are disposed spaced apart from each other in a seat width direction. In the present embodiment, the seat width direction coincides with a vehicle left-right direction.

The upper panel 13 extends in the seat width direction and is coupled to respective upper ends of the side frames 9, 11. The upper panel 13 is a panel-like frame with an approximately C-shaped open cross-section taken in a direction orthogonal to the extending direction of the upper panel 13. Here, the upper panel 13 according to the present embodiment is a panel member with an open cross-section that opens toward the rear side of the seat.

Two headrest supports 13A, 13B are secured to the upper panel 13. Each of the two headrest supports 13A, 13B is a tubular (in the present embodiment, a rectangular and tubular) member for supporting a headrest 4 (see FIG. 1). Also, the headrest 4 is a member for supporting the seated person's head.

Figure 3:
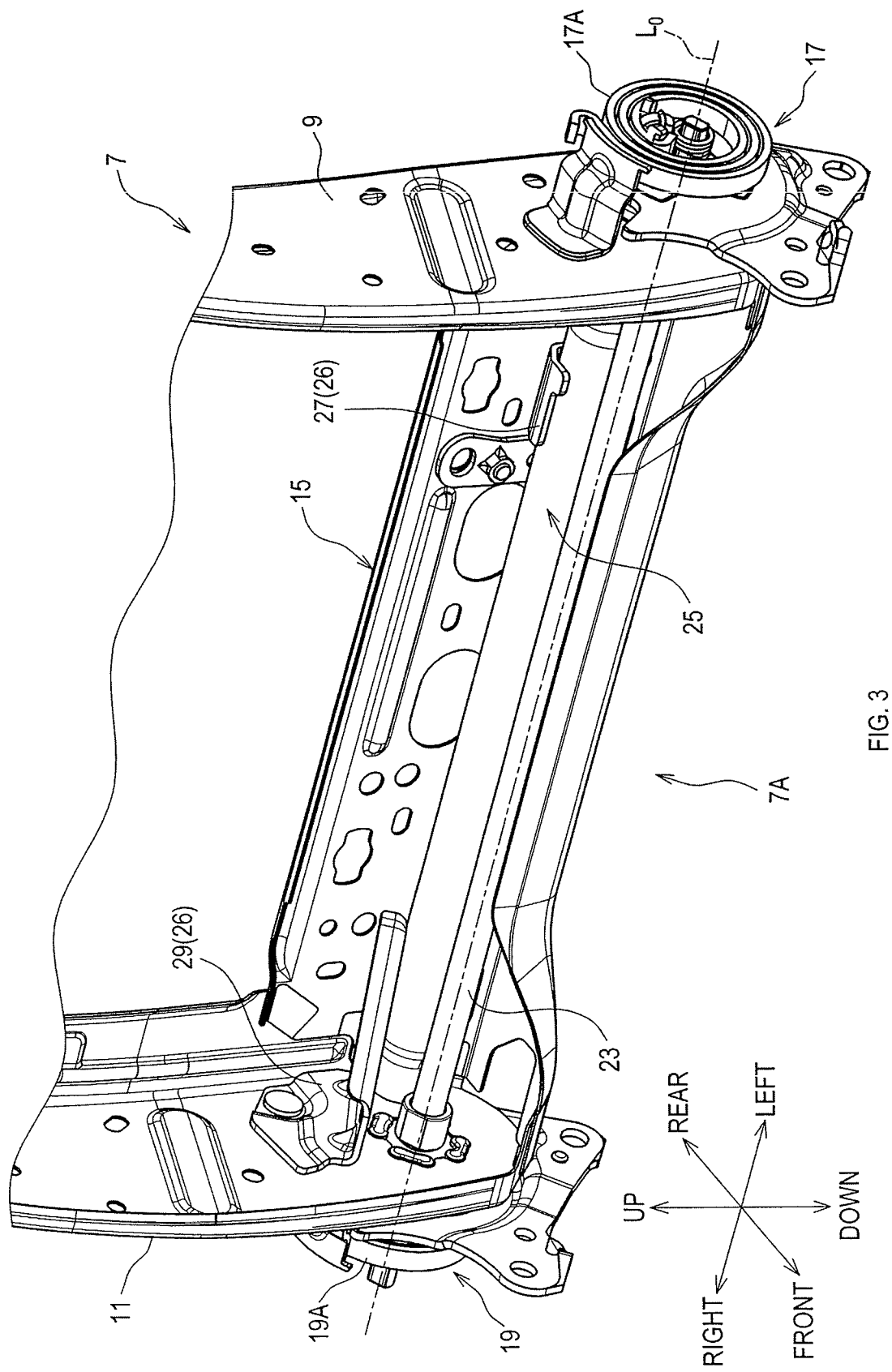
FIG. 3 is an enlarged perspective view of a portion including a lower panel of the back frame according to the first embodiment.
Figure 4:
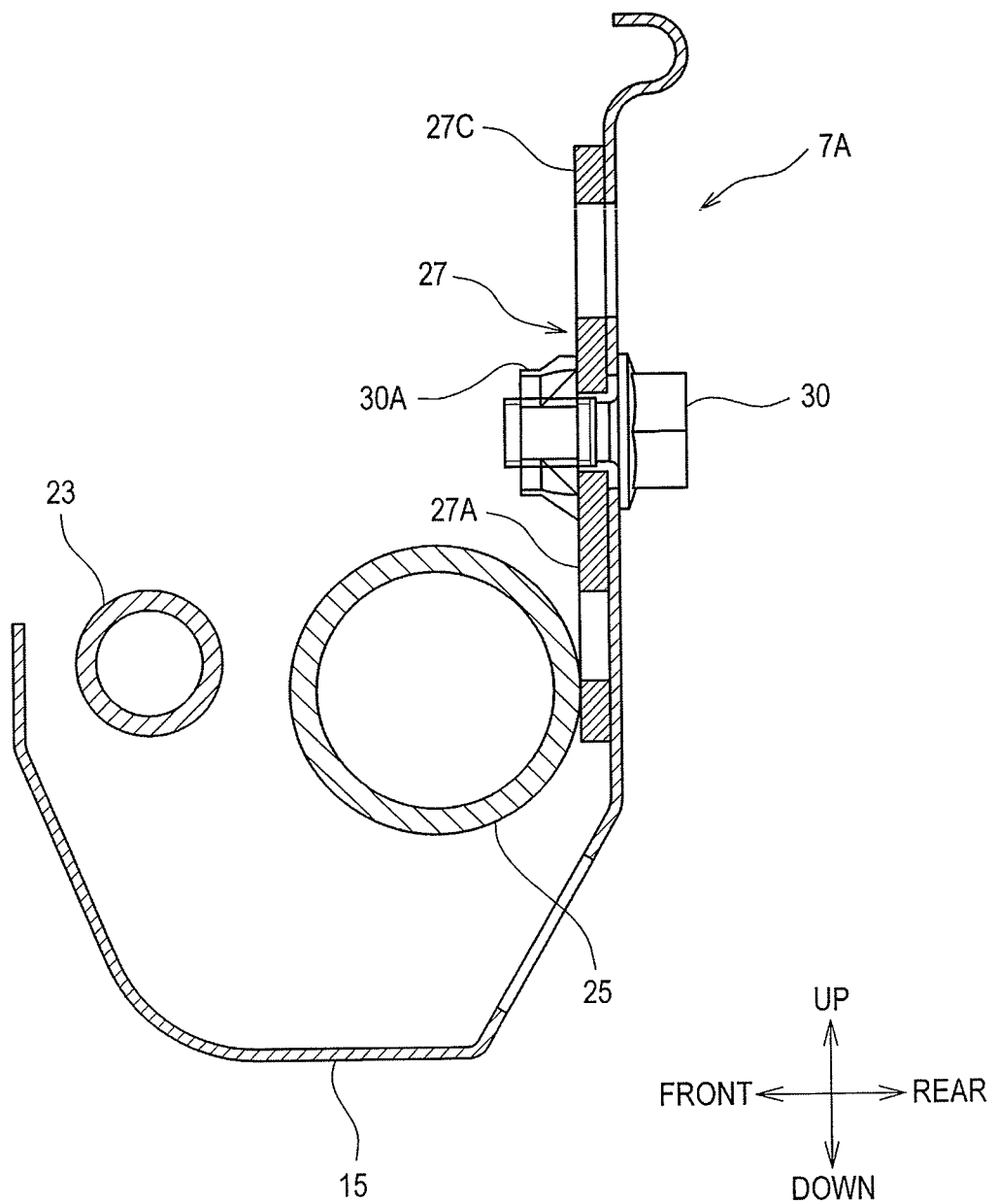
FIG. 4 is a sectional view of the lower panel, a beam member, a coupling rod, etc. according to the first embodiment, taken along a direction orthogonal to a seat width direction.

As shown in FIG. 3, the lower panel 15 extends in the seat width direction and is coupled to respective lower ends of the side frames 9, 11. The lower panel 15 is, as shown in FIG. 4, a member having an approximately C-shaped or J-shaped cross section taken along in a direction orthogonal to the extending direction of the lower panel 15.

Here, the lower panel 15 according to the present embodiment has a cross section, an upper side of which is open. The two side frames 9, 11, the upper panel 13, and the lower panel 15 are made of metal. The two side frames 9, 11, the upper panel 13, and the lower panel 15 are coupled and secured to one another by joining means, such as welding, or by using mechanical fasteners, such as screws, thereby forming a frame main body 7A.

As shown in FIG. 3, a beam member 25 having a rod-like shape and extending in the seat width direction is disposed between the two side frames 9, 11. The beam member 25 is formed of an inner hollow pipe, as shown in FIG. 4. Here, the beam member 25 in the present embodiment is formed of a round pipe.

Figure 5:
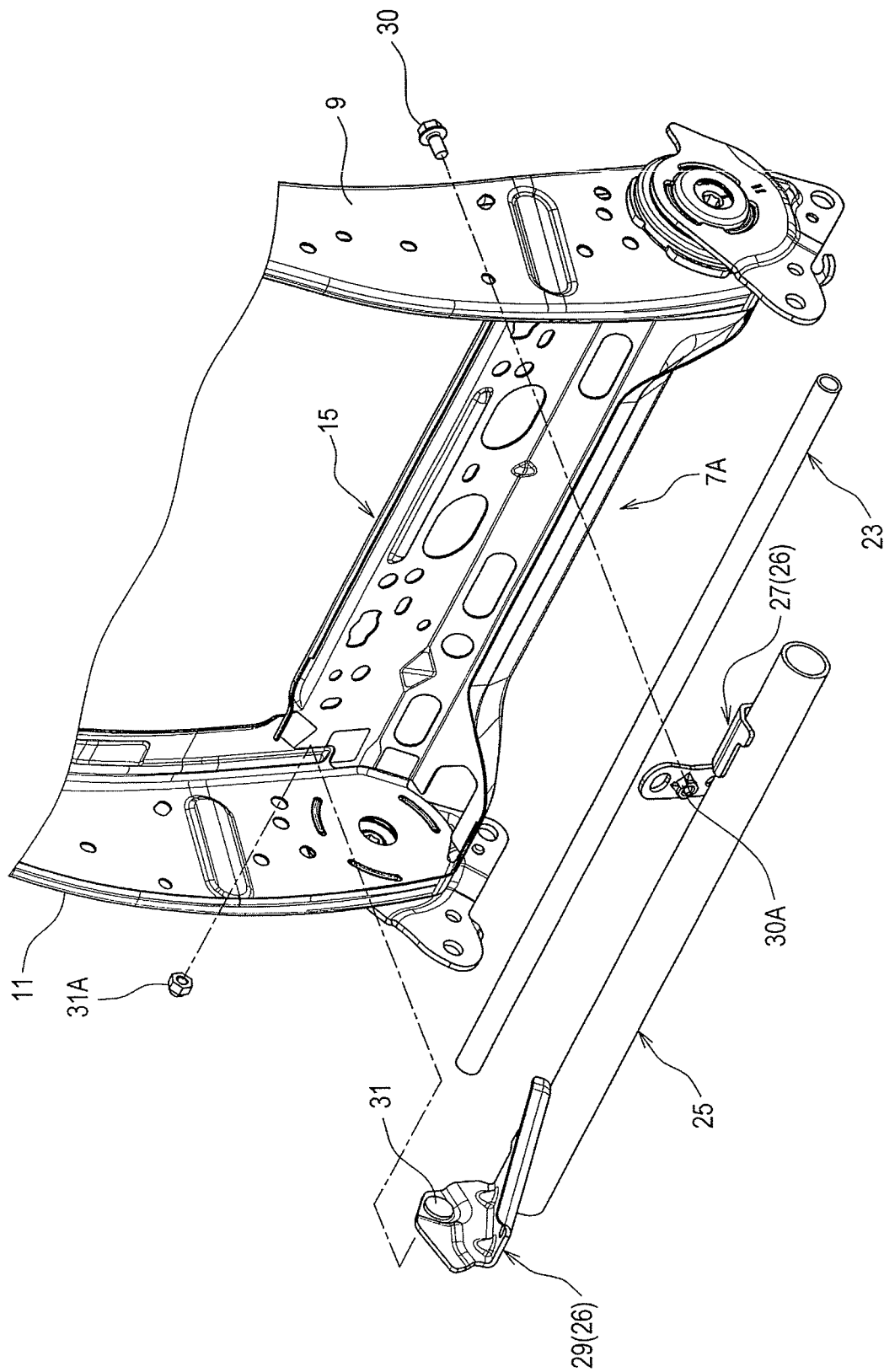
FIG. 5 is an exploded perspective view of the lower panel, the beam member, the coupling rod, etc. according to the first embodiment.

As shown in FIG. 5, the beam member 25 is coupled to the frame main body 7A via a bracket 26. The bracket 26 comprises a first bracket 27 and a second bracket 29.

The first bracket 27 is coupled to the lower panel 15 at a first end of the beam member 25 in the seat width direction. The second bracket 29 is coupled to the side frame 11 at a second end of the beam member 25 in the seat width direction. In the present embodiment, the first bracket 27 and the second bracket 29 are coupled and secured to the frame main body 7A by means of mechanical fasteners, such as screws and bolts.

Specifically, the first bracket 27 is coupled and secured to the lower panel 15 with a bolt 30 that penetrates through the lower panel 15 in the seat front-rear direction. A nut (weld nut) 30A to be fastened to the bolt 30 is welded to the first bracket 27.

Figure 6:
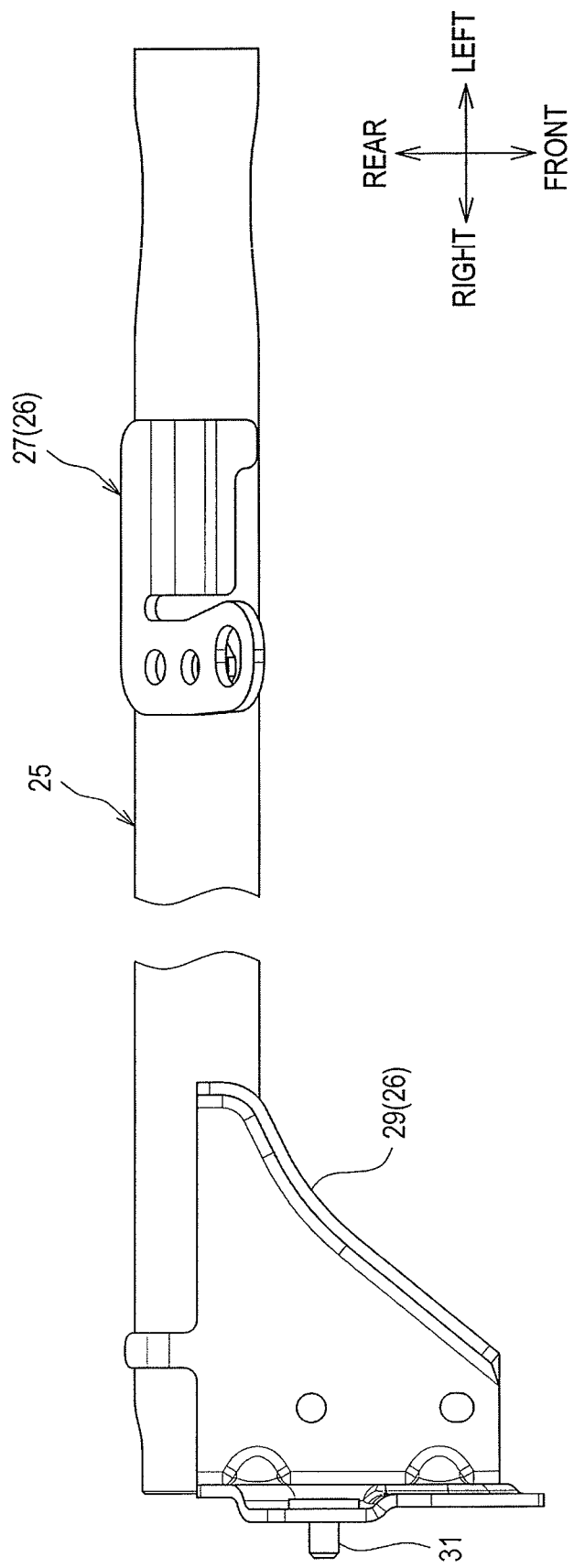
FIG. 6 is a view showing a state where a bracket is attached and secured to the beam member according to the first embodiment.

The second bracket 29 is coupled and secured to the side frame 11 with a bolt 31 (see FIG. 6) that penetrates through the side frame 11 in the seat width direction. The bolt 31 is secured to the second bracket 29 by welding or clamping.

Figure 7:
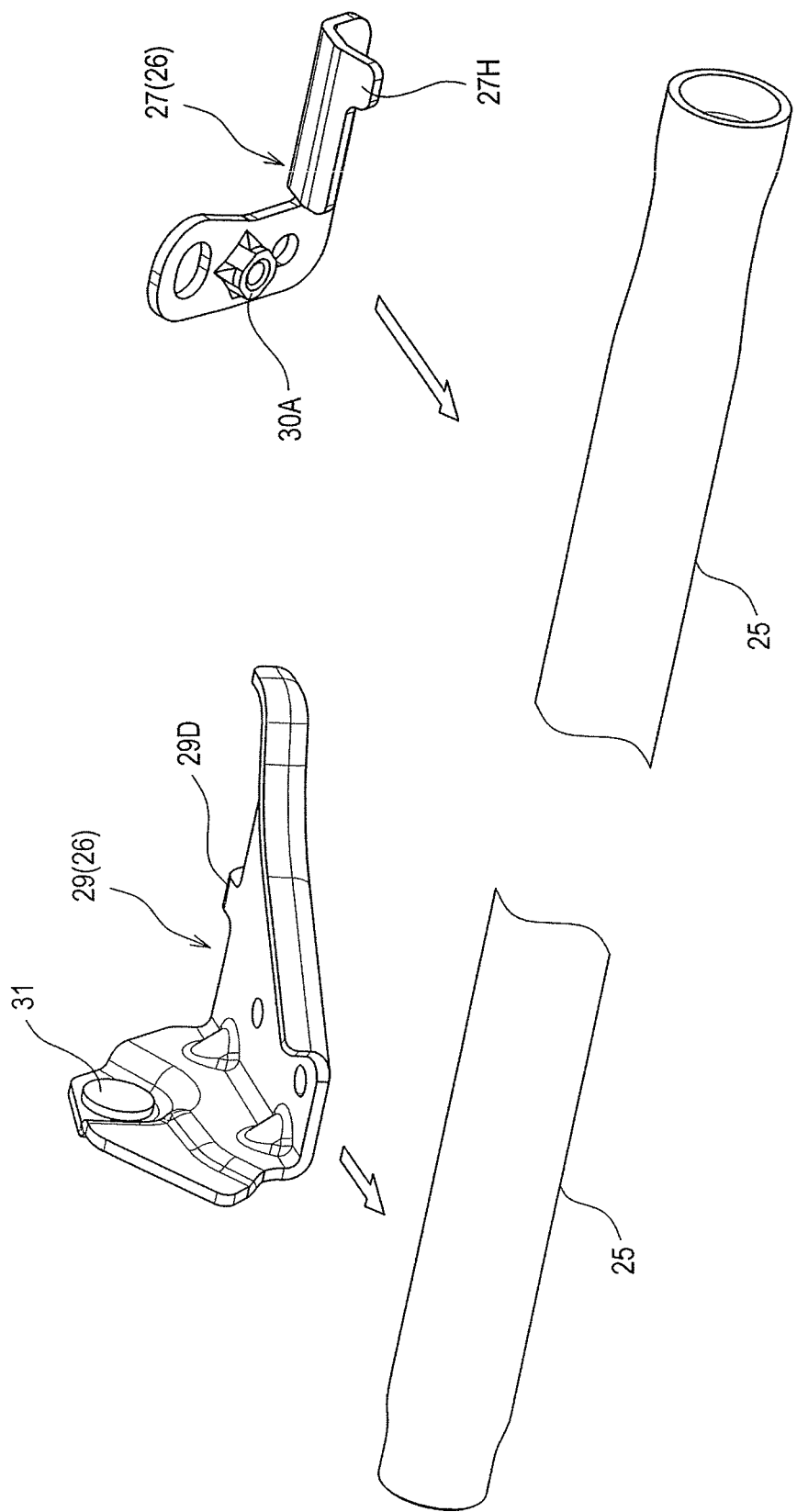
FIG. 7 is a view showing a state before the bracket is attached and secured to the beam member according to the first embodiment.

A nut (in the present embodiment, a cap nut) 31A (see FIG. 5) is fastened to the bolt 31 on a side of the side frame 11 opposite to another side of the side frame 11 where the second bracket 29 is secured. The bracket 26 is manufactured as a separate part from the beam member 25, and then welded and secured to the beam member 25 (see FIG. 7). Details of a welding structure of the bracket 26 will be described later.

2. Reclining Mechanism

As shown in FIG. 3, two recliners 17, 19 are provided such that each recliner is provided on a corresponding side of both sides of the back frame 7 in the seat width direction. Each of the two recliners 17, 19 is a mechanism for restricting pivoting (reclining) of the seatback 5, that is, the back frame 7.

That is, each of the two recliners 17, 19 is a mechanism for switching between a locked state where pivoting of the back frame 7 is restricted and an unlocked state where the locked state is released. Specifically, the recliners 17, 19 enter the unlocked state when a reclining lever 21 (see FIG. 1) is operated by a seated person, etc., whereas the recliners 17, 19 enter the locked state when the reclining lever 21 is not operated.

The coupling rod 23 is a member that causes the two recliners 17, 19 to switch between the locked state and the unlocked state. Specifically, the reclining lever 21 is provided at the first end side of the beam member 25 in the seat width direction. The coupling rod 23 extends in the seat width direction so as to transmit operation of the reclining lever 21 to the two recliners 17, 19.

As shown in FIG. 4, the coupling rod 23 is disposed at a position close to the beam member 25. That is, the beam member 25 is disposed at a position displaced from the coupling rod 23 in the seat front-rear direction and extends in a direction approximately parallel to the coupling rod 23. Here, the beam member 25 according to the present embodiment is displaced from the coupling rod 23 towards the rear of the seat.

When the reclining lever 21 is pivotably operated so as to be pulled upwardly, the coupling rod 23 rotates, in conjunction with this pivoting operation, about a center axis Lo of the coupling rod 23, thereby transmitting the pivoting operation to the two recliners 17, 19.

For this reason, when the reclining lever 21 is pivotably operated, the two recliners 17, 19 enter, in conjunction with the pivoting operation, the unlocked state from the locked state. When an operating force to the reclining lever 21 ends, the two recliners 17, 19 return to the locked state from the unlocked state and also, the reclining lever 21 is pivoted and the coupling rod 23 is rotated so as to return to their respective original positions by recovery forces from torsion coil springs 17A, 19A that are provided, respectively, in the two recliners 17, 19.

3. Welded Structure of Bracket 3.1 Welded Structure of First Bracket

Figure 8C:
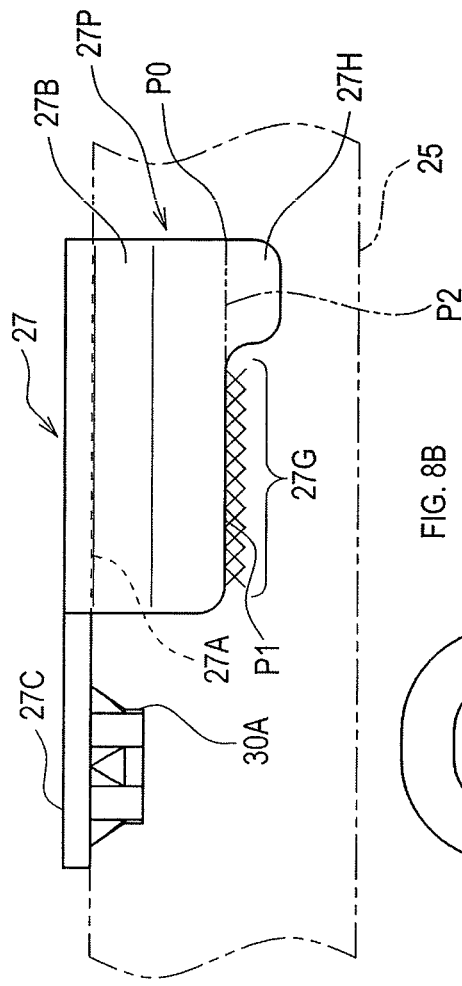
FIG. 8C is a left side view of the first bracket in FIG. 8A.
Figure 8A:
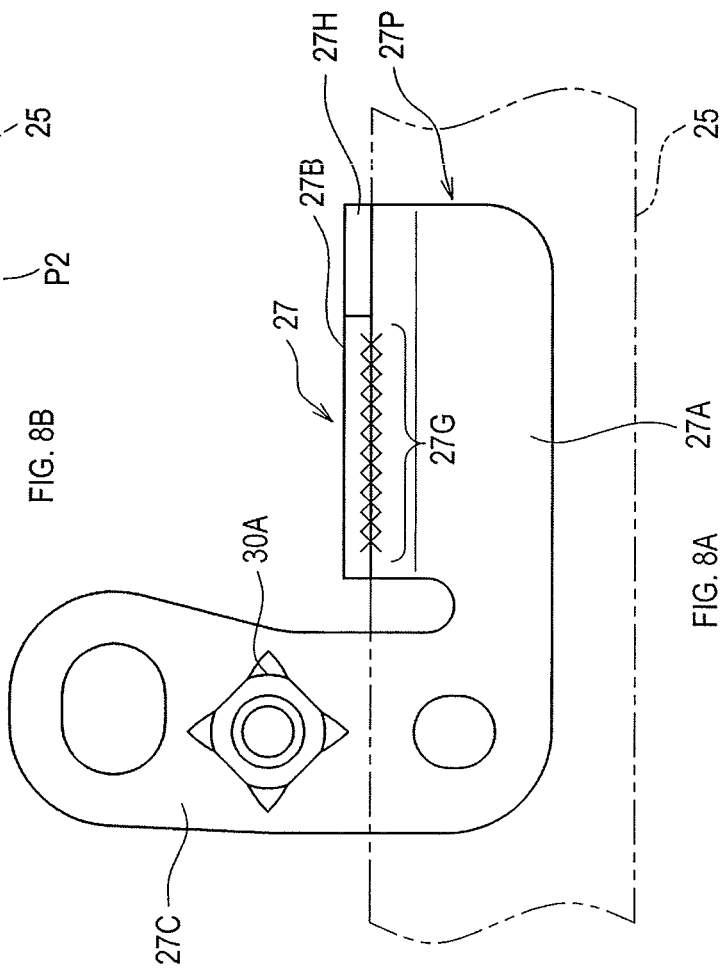
FIG. 8A is a front view of a first bracket according to the first embodiment.
Figure 8B:
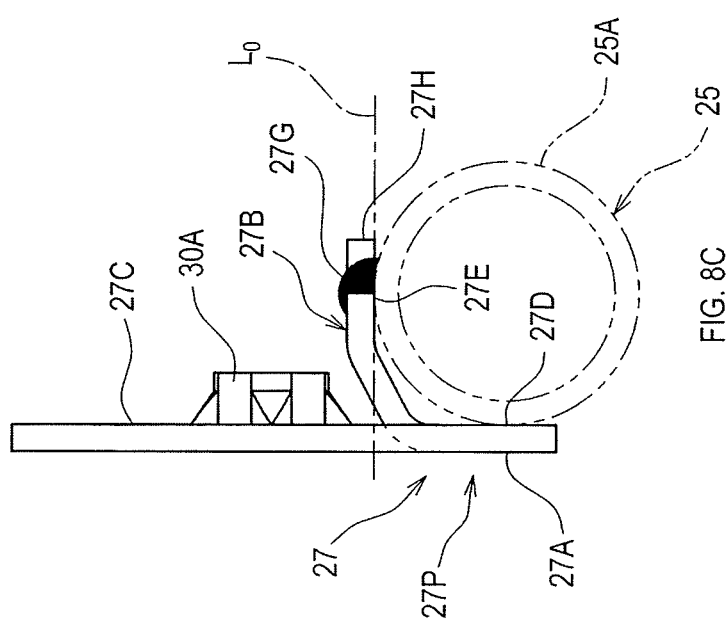
FIG. 8B is a top view of the first bracket in FIG. 8A.

The first bracket 27 comprises, as shown in FIGS. 8A to 8C, a first plate portion 27A, a second plate portion 27B, and a stay portion 27C.

The first plate portion 27A and the second plate portion 27B, respectively, comprise inner contact surfaces 27D and 27E to be in contact with an outer circumferential surface 25A of the beam member 25 (see FIG. 8C). An angle formed by the inner contact surface 27D and the inner contact surface 27E is approximately 90 degrees.

That is, a contact portion between the inner contact surface 27E and the beam member 25 is located at a position displaced by approximately 90 degrees from a contact portion between the inner contact surface 27D and the beam member 25 along the outer circumferential surface 25A of the beam member 25. At least the first plate portion 27A and the second plate portion 27B are made of metal and formed integrally with each other.

In the present embodiment, the first plate portion 27A and the second plate portion 27B are formed integrally with each other by plastic working, such as press working. Hereinafter, the first plate portion 27A and the second plate portion 27B are also collectively mentioned as "first bracket main body 27P".

The first bracket main body 27P comprises an end P0 that comprises a portion P1 welded to the outer circumferential surface 25A of the beam member 25. The remaining portion of the end P0 of the first bracket main body 27P, that is, a remaining portion P2 is not welded to the outer circumferential surface 25A of the beam member 25. That is, a welded portion 27G is provided in an end portion of the second plate portion 27B in an outer circumferential direction of the beam member 25 (see FIG. 8B), and an end portion of the first plate portion 27A in the outer circumferential direction of the beam member 25 is not welded (see FIG. 8A).

In the present embodiment, the first plate portion 27A and the second plate portion 27B are in contact with the outer circumferential surface 25A of the beam member 25. The first bracket main body 27P, specifically, the first bracket 27 has a curved or bent shape so as to extend generally along the outer circumferential surface 25A (see FIG. 8C). Accordingly, the welded portion 27G according to the present embodiment is provided in the portion P1 of the end P0 of the first bracket 27 in the outer circumferential direction (see FIG. 8C).

In the end P0 comprising the welded portion 27G of the first bracket main body 27P, an extending portion 27H is provided; the extending portion 27H extends in a direction away from the end P0. That is, when a tangential direction of the outer circumferential surface 25A at the welded portion 27G is referred to as an externally tangent direction Lo, the extending portion 27H is provided in a section of an end of the first bracket 27 in the externally tangent direction Lo and extends in a direction approximately parallel to the externally tangent direction Lo (see FIG. 8C).

In a case where the beam member 25 is formed of a round pipe as in the present embodiment, the aforementioned "outer circumferential direction", in other words, "direction along the outer circumferential surface 25A" is a direction along an outer circumference of a circular cross-section of the round pipe.

Figure 11:
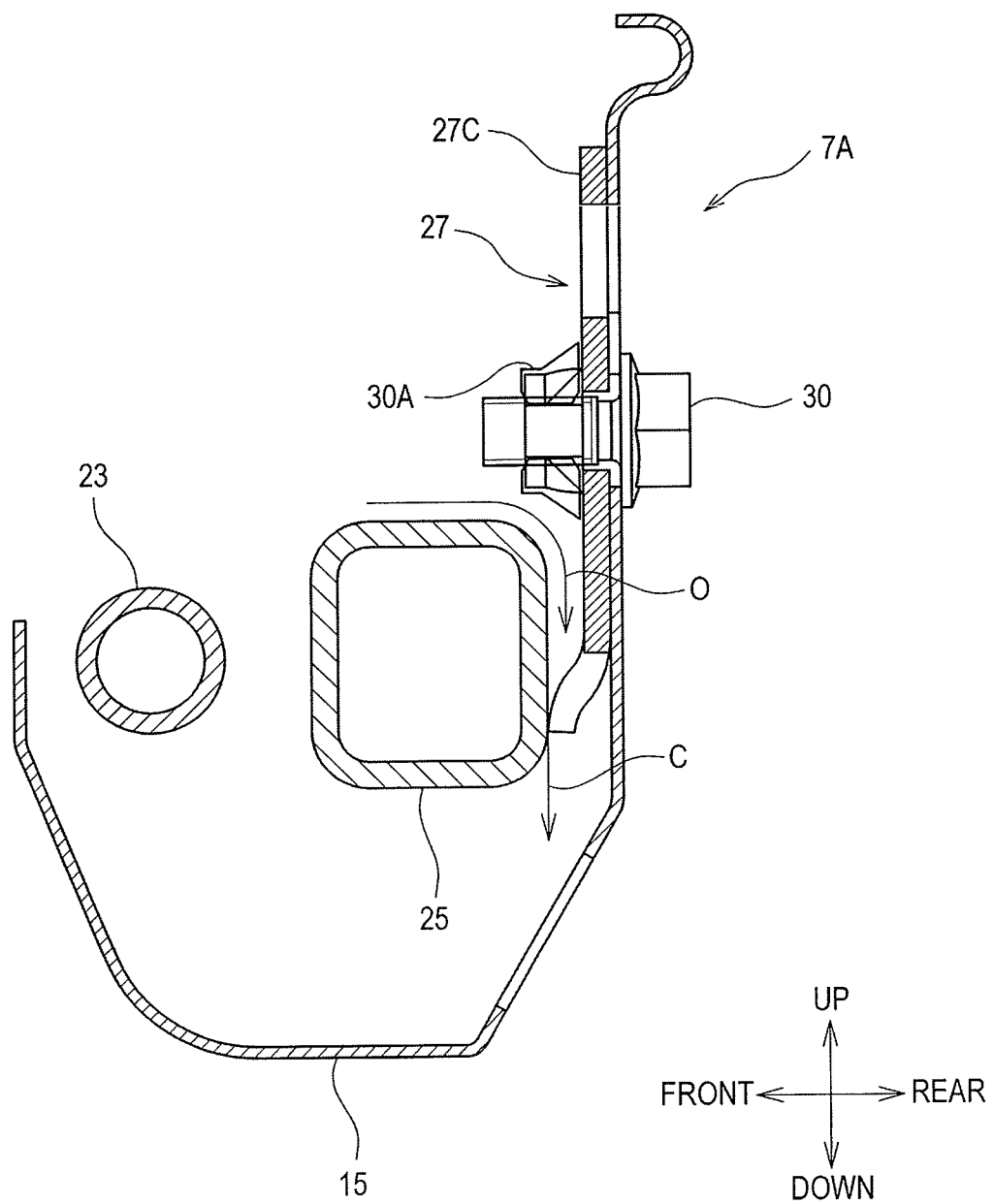
FIG. 11 is a sectional view showing the lower panel, a beam member, the coupling rod, etc., according to a second embodiment, taken along a direction orthogonal to the seat width direction.

If the beam member 25 is formed of a rectangular pipe, "outer circumferential direction" is a direction along a perimeter of a rectangular cross-section of the rectangular pipe (see FIG. 11). In this case, the externally tangent direction coincides with a direction that includes an outer circumferential plane of the beam member 25 where the welded portion 27G is located (see FIG. 11).

Accordingly, "outer circumferential direction (i.e., direction along the outer circumferential surface 25A)" in the present disclosure can be also defined as below.

That is, assuming that there is an imaginary plane parallel to the longitudinal direction of the beam member 25 and the externally tangent direction and that the beam member 25 projected on the imaginary plane is specified as "projected beam member", "outer circumferential direction (i.e., direction along the outer circumferential surface 25A)" is a direction that is parallel to a direction approximately orthogonal to the longitudinal direction of the "projected beam member" on the imaginary plane.

A weld bead on the welded portion 27G extends along a direction approximately parallel to the longitudinal direction of the beam member 25 (see FIG. 8A). The extending portion 27H is provided in a portion that is adjacent to the welded portion 27G in the aforementioned longitudinal direction. That is, the extending portion 27H is provided at least at a first end side of the weld bead in the extending direction of the weld bead (see FIG. 8B).

The stay portion 27C is a portion to which the nut 30A is secured. The stay portion 27C according to the present embodiment is formed integrally with the first bracket main body 27P (specifically, the second plate portion 27B). That is, the first plate portion 27A, the second plate portion 27B, and the stay portion 27C are made of metal and formed integrally with one another by plastic working, such as press working.

In a state where the first bracket 27 is attached to the lower panel 15, as shown in FIG. 4, the stay portion 27C and the first plate portion 27A are in contact with the lower panel 15. Thus, the stay portion 27C and the first plate portion 27A are parallel to each other.

3.2 Welded Structure of Second Bracket

Figure 9C:
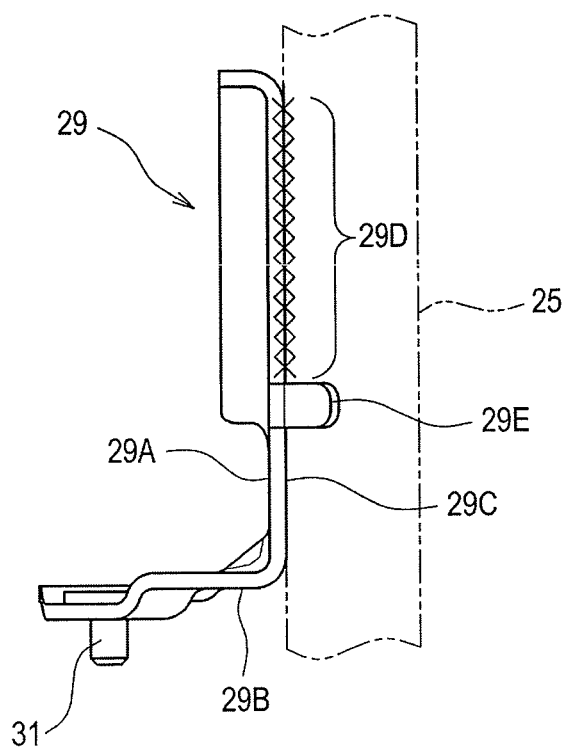
FIG. 9C is a top view of the second bracket in FIG. 9B.
Figures 9A, 9B:
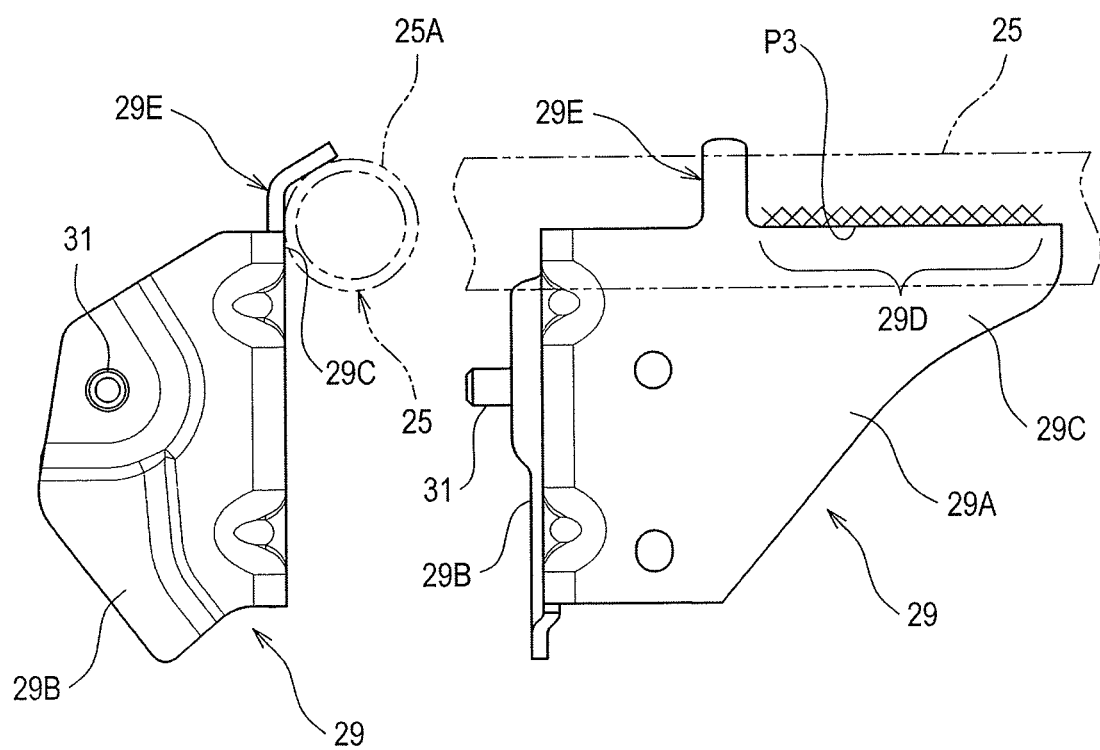
FIG. 9A is a front view of a second bracket according to the first embodiment.
FIG. 9B is a left side view of the second bracket in FIG. 9A.

As shown in FIGS. 9A to 9C, the second bracket 29 comprises a plate portion 29A and a stay portion 29B. The plate portion 29A comprises an inner contact surface 29C that is to be in contact with the outer circumferential surface 25A of the beam member 25 (see FIG. 9B).

As shown in FIG. 9A, a welded portion 29D is provided in a first end portion P3 of the plate portion 29A in an externally tangent direction. Here, "externally tangent direction" is referred to, as in the externally tangent direction described with respect to the first bracket 27, a direction parallel to a tangential direction of the outer circumferential surface 25A at the welded portion 29D.

In the first end portion P3 of the plate portion 29A in the externally tangent direction, an extending portion 29E is provided; the extending portion 29E extends in a direction away from the first end portion P3. As shown in FIG. 9B, the extending portion 29E according to the present embodiment is configured such that a tip end thereof in the extending direction is curved or bent toward the beam member 25.

In other words, a base part of the extending portion 29E extends from the first end portion P3 of the plate portion 29A in a direction approximately parallel to the externally tangent direction. The tip end of the extending portion 29E is tilted toward the externally tangent direction so as to approach the beam member 25. Thus, the second bracket 29 is in contact with the outer circumferential surface 25A of the beam member 25, at the inner contact surface 29C and the tip end of the extending portion 29E.

As shown in FIG. 9C, a weld bead on the welded portion 29D extends in a direction approximately parallel to the longitudinal direction of the beam member 25. The extending portion 29E is provided in a portion of the plate portion 29A adjacent to the welded portion 29D in the aforementioned longitudinal direction. That is, the extending portion 29E is provided at least on at a first end side of the weld bead in the extending direction of the weld bead.

The stay portion 29B is a portion to which the bolt 31 is secured. The stay portion 29B according to the present embodiment is formed integrally with the plate portion 29A. That is, the plate portion 29A and the stay portion 29B are made of metal and formed integrally with each other by plastic working, such as press working.

In a state where the second bracket 29 is attached to the side frame 11, only the stay portion 29B is in contact with the side frame 11. For this reason, the stay portion 29B and the plate portion 29A form a right angle therebetween.

3.3 Attachment of Frame Main Body to Beam Member (see FIG. 5)

A work for attaching the beam member 25 to the frame main body 7A is carried out in the following procedure. First, a worker inserts the bolt 31 provided in the second bracket 29 into the side frame 11.

Next, the worker inserts and penetrates the bolt 30 through the lower panel 15 so as to fasten this bolt 30 into the nut 30A and thereafter, fastens the nut 31A to the bolt 31. In this regard, the worker may fasten the nut 31A to the bolt 31 and thereafter, inserts and penetrates the bolt 30 through the lower panel 15 so as to fasten this bolt 30 into the nut 30A.

4. Characteristics of Vehicle Seat in Present Embodiment

In the back frame 7 according to the present embodiment, the beam member 25 is coupled to the frame main body 7A via the first bracket 27 and the second bracket 29. For this reason, the back frame is almost not affected by differences in size of the beam member 25 in the longitudinal direction, degree of parallelism between a first end surface and a second end surface of the beam member 25, etc. Accordingly, it is possible to obtain the back frame 7 that can improve manufacturing productivity.

Moreover, the first bracket 27 and the second bracket 29 according to the present embodiment are welded at their respective ends to the outer circumferential surface 25A of the beam member 25. For this reason, the first bracket 27 and the second bracket 29 may be deformed by heat at the time of welding, and other ends excluding the aforementioned respective ends may be largely displaced to be away from or come close to the beam member 25.

Figure 10A:
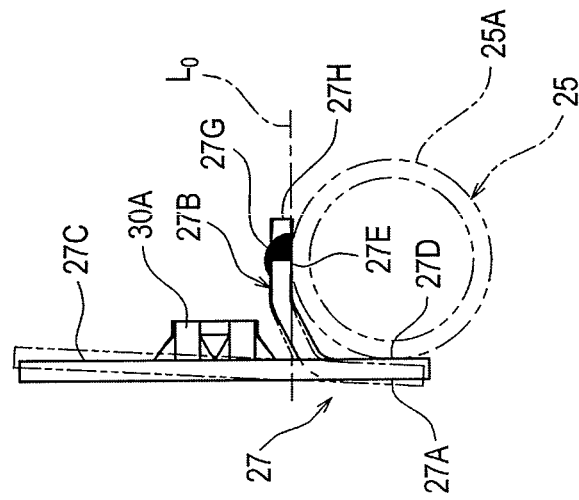
FIG. 10A is an explanatory diagram showing features of the first embodiment.
Figure 10B:
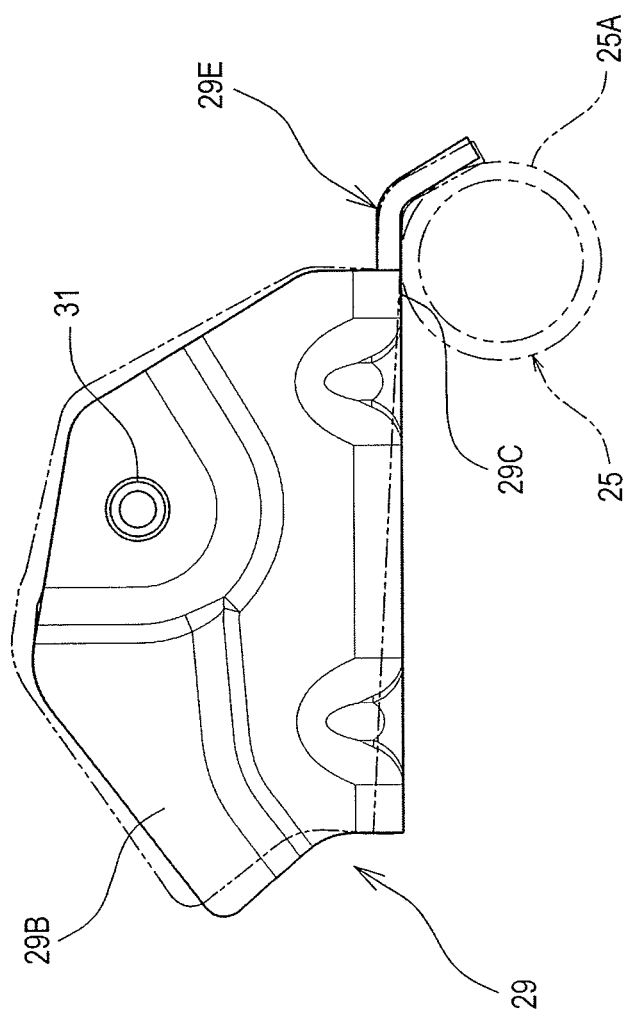
FIG. 10B is an explanatory diagram showing features of the first embodiment.

In other words, the aforementioned other ends of the first bracket 27 and the second bracket 29 may be displaced, by the heat at the time of welding, from positions indicated by the solid line (i.e., designed center position) to positions indicated by long-dashed and double-short-dashed lines, as shown in FIGS. 10A and 10B.

If the above-described large thermal deformation occurs in the first bracket 27 and the second bracket 29, the first bracket 27 and the second bracket 29 and therefore, the beam member 25 may not be appropriately coupled and secured to the frame main body 7A. To solve this problem, in the present embodiment, the extending portion 27H extending in a direction away from the end of the first bracket 27 is provided, and the extending portion 29E extending in a direction away from the end of the second bracket 29 is provided.

For this reason, in a case where thermal deformation occurs in the first bracket 27 and the second bracket 29 by heat at the time of welding, the extending portions 27H, 29E come in contact with the outer circumferential surface 25A, thereby inhibiting further development of the thermal deformation. Consequently, large deformation of the first bracket 27 and the second bracket 29 can be inhibited.

The extending portion 27H of the first bracket 27 is provided in the section of the end of the first bracket 27 in the outer circumferential direction. This can ensure that effects of inhibiting deformation are obtained.

Each of the extending portions 27H, 29E extends from the ends of the bracket 26 in a direction approximately parallel to the externally tangent direction. This can further ensure that effects of inhibiting deformation are obtained.

As for the extending portion 29E of the second bracket 29, the base part of the extending portion 29E extends, from the first end portion P3, in the direction approximately parallel to the externally tangent direction, and the tip end of the extending portion 29E is tilted toward the externally tangent direction so as to approach the beam member 25. This can ensure that effects of inhibiting deformation are obtained.

The weld bead on each of the welded portions 27G, 29D extends in the direction approximately parallel to the longitudinal direction of the beam member 25. Thus, compared with welding along the outer circumferential direction, it can be ensured that the first bracket 27 and the second bracket 29 is welded and secured to the beam member 25.

The first bracket 27 is secured to the lower panel 15, and the second bracket 29 is secured to the side frame 11.

Thus, for example, compared with a case where both the first bracket 27 and the second bracket 29 are secured to the lower panel 15, where the first bracket 27 and the second bracket 29 are secured, respectively, to the side frames 9 and 11, differences in size, etc., of the beam member 25, the first bracket 27, and the second bracket 29 can be easily accommodated, thereby coupling and securing the beam member 25 to the frame main body 7A.

[Second Embodiment]

The beam member 25 according to the present embodiment is formed of a rectangular pipe as shown in FIG. 11. Thus, compared with a case where the beam member 25 is formed of a round pipe, bending rigidity and buckling strength of the beam member 25 can be improved.

The same constituent elements, etc. as those in the above-described embodiment are assigned with the same reference numerals as those in the above-described embodiment and therefore, the same descriptions will not be repeated here.

[Other Embodiment]

In the bracket 26 in the above-described embodiments, the welded portions 27G, 29D may be provided, respectively, in longitudinal ends of the first bracket 27 and the second bracket 29. In this case, it is configured such that a weld bead extends in the outer circumferential direction or the externally tangent direction and that the extending portions 27H, 29E extend from respective ends of the first bracket 27 and the second bracket 29 in the longitudinal direction.

In the above-described embodiments, as in the extending portion 29E of the second bracket 29, a tip end of the extending portion 27H may be bent toward the beam member 25. It is desirable that the tip end is curved along the outer circumferential direction.

The beam member 25 in the above-described embodiments may be, for example, formed of a hollow rectangular pipe, a solid round rod, a solid rectangular bar, or the like.

The above-described embodiments have been described with respect to a front seat of a passenger car. However, the present disclosure is not limited to such a front seat and can be applied to a seat for other automobiles, or a seat to be used for a vehicle, such as railroad vehicles, ships, airplanes, and the like.

Moreover, the present disclosure may include any mode consistent with the principles of the invention recited in the claims and therefore, should not be limited to the above-described embodiments. Accordingly, among the above-described embodiments, a configuration made by combining at least two of the embodiments may be employed.

What is claimed is:

1. A back frame for a vehicle seat, the back frame to be used in a seatback of the vehicle seat, the back frame comprising:
   a frame main body comprising two side frames that extend in an approximately up-down direction and that are disposed spaced apart from each other in a seat width direction;
   a beam member formed in a rod-like shape, disposed between and attached to the two side frames, and extending in the seat width direction;
   a bracket that couples the beam member to the frame main body, and that comprises a welded portion in an end of the bracket, the welded portion being welded to an outer circumferential surface of the beam member;
   an extending portion provided in the end of the bracket and extending in a direction away from the end of the bracket; and
   the bracket including a plate portion, the plate portion including a plate surface that comes into contact with the beam member.

2. The back frame for a vehicle seat according to claim 1, wherein the extending portion is provided at a section of the end of the bracket, the section of the end of the bracket being located in a direction along the outer circumferential surface of the beam member.

3. The back frame for a vehicle seat according to claim 1, wherein the extending portion extends from the end of the bracket in a direction approximately parallel to a tangential direction of the outer circumferential surface of the beam member at the welded portion.

4. The back frame for a vehicle seat according to claim 1, wherein a weld bead on the welded portion extends in a direction approximately parallel to a longitudinal direction of the beam member.

5. The back frame for a vehicle seat according to claim 1 further comprising:
   two recliners, each being provided in a corresponding one of the two side frames, the two recliners being switchable between a locked state where pivoting of the frame main body is restricted and an unlocked state where the locked state is released; and
   a coupling rod that extends in the seat width direction and that rotates so as to cause the two recliners to switch between the locked state and the unlocked state,
   wherein the beam member extends in a direction approximately parallel to the coupling rod at a position displaced from the coupling rod in a seat front-rear direction.

6. The back frame for a vehicle seat according to claim 1, wherein the frame main body comprises a lower panel that extends in the seat width direction and couples to respective lower ends of the two side frames, and
   wherein the bracket comprises a first bracket coupled to the lower panel at a first end of the beam member in the seat width direction, and a second bracket coupled to one of the two side frames at a second end of the beam member in the seat width direction.

7. The back frame for a vehicle seat according to claim 1, wherein the bracket comes into contact with the beam member at least at two positions spaced apart in a circumferential direction on the outer circumferential surface of the beam member.

8. A back frame for a vehicle seat, the back frame to be used in a seatback of the vehicle seat, the back frame comprising:
- a frame main body comprising two side frames that extend in an approximately up-down direction and that are disposed spaced apart from each other in a seat width direction;
- a beam member formed in a rod-like shape, disposed between and attached to the two side frames, and extending in the seat width direction;
- a bracket that couples the beam member to the frame main body, and that comprises a welded portion in an end of the bracket, the bracket end being located in a direction along the outer circumferential surface of the beam member, the welded portion being welded to an outer circumferential surface of the beam member;
- an extending portion extending in the direction along the outer circumferential surface of the beam member beyond the welded portion.

9. A back frame for a vehicle seat, the back frame to be used in a seatback of the vehicle seat, the back frame comprising:
- a frame main body comprising two side frames that extend in an approximately up-down direction and that are disposed spaced apart from each other in a seat width direction;
- a beam member formed in a rod-like shape, disposed between and attached to the two side frames, and extending in the seat width direction;
- a bracket that couples the beam member to the frame main body, and that comprises a welded portion in an end of the bracket, the welded portion being welded to an outer circumferential surface of the beam member;
- an extending portion provided in the end of the bracket and extending in a direction away from the end of the bracket; and
- a size of a weld bead of the welded portion in a longitudinal direction of the beam member is larger than a size of the weld bead of the welded portion in a direction along the outer circumferential surface of the beam member.

* * * * *